United States Patent
Hassell Sweatman et al.

(10) Patent No.: US 7,233,634 B1
(45) Date of Patent: Jun. 19, 2007

(54) MAXIMUM LIKELIHOOD DECODING

(75) Inventors: Catherine Hassell Sweatman, Auckland (NZ); John Scott Thornpson, Edinburgh (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 812 days.

(21) Appl. No.: 10/401,003

(22) Filed: Mar. 27, 2003

(51) Int. Cl.
*H03D 1/04* (2006.01)
(52) U.S. Cl. .................................. 375/346; 375/146
(58) Field of Classification Search ............... 375/147, 375/316, 346, 324, 347, 348, 349, 350, 351, 375/148
See application file for complete search history.

(56) References Cited

U.S. PATENT DOCUMENTS

| | | | | |
|---|---|---|---|---|
| 4,283,682 A | * | 8/1981 | Sifford et al. | 329/310 |
| 5,657,355 A | * | 8/1997 | Reusens | 375/340 |
| 6,115,435 A | * | 9/2000 | Harada et al. | 375/341 |
| 6,873,651 B2 | * | 3/2005 | Tesfai et al. | 375/219 |
| 6,898,757 B1 | * | 5/2005 | Zhong et al. | 714/794 |
| 7,016,401 B1 | * | 3/2006 | Smith et al. | 375/222 |

OTHER PUBLICATIONS

M. O. Damen, K. Abed-Meraim, J-C Belfiore, "Generalised Sphere Decoder for Asymmetrical Space-Time Communication Architecture", Electronics Letters, vol. 36. No. 2, Jan. 20, 2000.
M. O. Damen, K. Abed-Meraim, J-C Belfiore, "A Generalised Lattice Decoder for Asymmetrical Space-Time Communication Architecture", Proceedings of the IEEE International Conference on Acoustics, Speech and Signal Processing 2000 (ICASSP 2000), vol. 5, pp. 2581-2584.
M. O. Damen, A. Chkeif, J-C Belfiore, "Sphere Decoding of Space-Time Codes", ISIT 2000, Sorrento, Italy, Jun. 25-30, 2000, p. 362.
M. O. Damen, K. Abed-Meraim, M. S. Lemandi, "Further Results on the Sphere Decoder", ISIT 2001, Washington D.C., Jun. 24-29, 2001, p. 333.

* cited by examiner

*Primary Examiner*—Chieh M. Fan
*Assistant Examiner*—Jason M. Perilla
(74) *Attorney, Agent, or Firm*—Barnes & Thornburg, LLP

(57) ABSTRACT

A method of maximum likelihood decoding for detecting the signals transmitted over a Multiple-Input-Multiple-Output (MIMO) channel of a communication system in which there are N co-channel transmit antennas and M co-channel receive antennas. In a first method an orthotope (22) is generated in input signal space centred on an approximate transmit signal point τ which is an inverse mapping from an actual received signal point (y) in output signal space. Only possible transmit points located within the orthotope are considered as candidate points and are transformed into corresponding candidate receive signal points in output signal space. The Euclidean distance between the candidate receive signal points and the actual signal point is calculated and the closest candidate receive signal is selected as the detected received point. In an alternative method, the orthotope is constructed as the smallest such orthotope which can contain a hyperellipsoid (20) in input signal space, which hyperellipsoid is a transformation from output signal space of a hypersphere (18) centred on the actual received signal point (y). Those transmit signal points which lie within the orthotope (22) but outside of the ellipsoid (20) are discarded and the remaining points within the orthotope are considered as candidate points, in the same way as described above.

41 Claims, 4 Drawing Sheets

MAXIMUM LIKELIHOOD DECODING

FIELD OF THE INVENTION

This invention relates to a method and apparatus for carrying out Maximum Likelihood Decoding (MLD) of multi-stream data transmissions over a Multiple-Input-Multiple-Output (MIMO) channel of a communications system.

BACKGROUND OF THE INVENTION

In a typical MIMO channel of a wireless communications system, as depicted in FIG. 1, the number of co-channel transmit antennas is denoted by N and the number of co-channel receive antennas is denoted by M. Each transmit antenna sends a signal that represents digital information and each receive antenna receives a signal from each transmit antenna. Generally, the transmitted signal will be changed by propagation between the transmit and receive antennas, ie. by propagation across the channel. For example, the transmitted signal may be subject to 'flat fading', in which the effect of propagation across the channel can be represented by multiplication of the transmitted signal by a number, which number represents the effect of the channel. In addition, at the receive antennas, noise will be present, which adds to the signal received from the transmit antennas.

Considering a simple modulation scheme, such as binary phase shift keying, a +1 is sent to represent a binary bit '1' and a −1 is sent to represent a binary bit '0'. If there is one transmit antenna (N=1), then there are two possible signals that could be received from the transmit antenna, a +1 or a −1. MLD is known to be the optimum detection algorithm for use in the receiver of a MIMO channel for deciding whether a +1 or a −1 was transmitted.

MLD detects all N streams of data sent across the channel in parallel, by searching over all possibilities of what could have been transmitted and choosing the one of the possible transmitted signals which yields a received signal closest, in terms of Euclidean Distance, to what was actually received. The idea is to reconstruct the signal that would have been received had no noise been present. Referring back to the simplest case example above, there are two possible transmitted signals, and from these, two ideal possible received signals are created. The ideal received signals are then compared with what was actually received and the ideal signal which is closest to what was actually received is selected as the most likely ideal transmitted signal. This is the signal that the MLD system detects. If the noise is very severe then the wrong ideal signal may be selected, however the channel will operate satisfactorily, provided such errors do not occur too often. The advantage of MLD is that fewer such errors are made as compared to other systems for detecting multi-stream data transmissions over a MIMO channel of a communications system in the channel receiver.

A problem with MLD is when the number N of transmit antennas, ie. the number of transmitted data streams increases. Using a binary phase shift keying modulation scheme, the number of possible ideal signals is $2^N$ which increases rapidly with N making the computational workload required to implement MLD extremely high. This problem is further exacerbated when a more complex modulation scheme such as 4-QAM or 16QAM is used to send more data bits across the channel simultaneously. For example, in 16-QAM there are 16 possible signals that could be transmitted by each antenna allowing 4 bits of data to be transmitted simultaneously. In this case the number of possible ideal signals is $16^N$. For many situations of practical interest the number of possible ideal signals is simply too high and the computational load becomes unmanageable.

As illustrated in FIG. 2, the set of possible transmitted signals can be represented as a multi-dimensional array or lattice of transmitted signal points in an input (transmitted) signal space. Similarly, the set of corresponding possible ideal received signals can be represented as a multi-dimensional array or lattice of ideal received signal points in an output (received) signal space. A channel mapping can be applied to the signal points in the input space to generate the corresponding signal points in the output space, which represents the effect of the channel on the transmitted signal. A channel pseudo-inverse mapping (an inverse mapping to the channel mapping) can be applied to the signal points in the output space to generate the corresponding signal points in the input space.

In order to reduce computational load, a refinement of MLD has been implemented, known as Generalised Sphere Decoding (GSD). GSD reduces complexity by bounding the search to consider only possible ideal received signal points that lie within a hypersphere in output (received) signal space, centred at the actual received signal, as shown in FIG. 2. In fact the search is done in input (transmitted) signal space, and so the process involves identifying those transmitted signal points within the lattice, which fall within a hyperellipsoid, which is the mapping of the hypersphere into input space. Provided that the hyperellipsoid is chosen to be large enough that at least one signal point falls inside it, then those signal points lying outside the hyperellipsoid cannot be the most likely transmitted signal point. The signal points lying outside of the hyperellipsoid can thus be discarded at an early stage. GSD transforms only the remaining signal points located within the hyperellipsoid into output signal space using the channel mapping, to generate a set of ideal received signal points. Then GSD calculates the Euclidean Distance between each of the ideal received signal points in the set and the actual received signal point. The ideal received signal point with the smallest Euclidean Distance is selected as corresponding to the maximum likelihood ideal transmitted signal. The problem with the GSD is that the search to identify transmitted signal points in the input signal space lying within the hyperellipsoid can have a high computational load.

SUMMARY OF THE INVENTION

The present invention relates generally to maximum likelihood decoding for detecting signals transmitted over a Multiple-Input-Multiple-Output (MIMO) channel in which the number of possible transmit signal points considered in the method is limited to those located in an orthotope centred on a noise corrupted transmit signal point derived from the received signal, which orthotope has sides parallel to the axes of the multi-dimensional input space. With the orthotope having sides parallel to the axes, the problem of determining whether a given transmit signal point is in the orthotope comprises a simple comparison of the locations of the sides of the orthotope with the corresponding elements of the vectors defining the possible transmit points.

In accordance with a first aspect of the present invention, there is provided a method of maximum likelihood decoding for detecting signals transmitted over a Multiple-Input-Multiple-Output (MIMO) channel of a communication system, comprising the steps of:

considering in the method an array of possible transmit signal points in multidimensional input space, limiting a candidate set of the possible transmit signal points to those located inside an orthotope centred on a noise corrupted transmit signal point derived from the received signal, which orthotope has sides parallel to the axes of the multi-dimensional input space; and applying further steps in the method to the candidate set of possible transmit signal points.

In accordance with a second aspect of the present invention, there is provided, computer readable media for installation in a digital processor of a receiver detecting signals transmitted over a MIMO channel of a communication system for carrying out the steps of:

deriving a noise corrupted transmit signal point derived from a signal received over the channel;

constructing an orthotope in multi-dimensional input space centred on the noise corrupted transmit signal point, which orthotope has sides parallel to the axes of the multi-dimensional input space;

selecting candidate possible transmit signal points from an array of possible transmit signal points in multi-dimensional input space by selecting only those possible transmit signal points located inside the orthotope.

According to a third aspect of the present invention there is provided receiving apparatus of a single entity of a communications system which apparatus comprises a digital processor for detecting signals transmitted over a Multiple-Input-Multiple-Output (MIMO) channel of the communication system, which digital processor comprises:

means for deriving a noise corrupted transmit signal point from a signal received over the channel;

means for constructing an orthotope in multi-dimensional input space centred on the noise corrupted transmit signal point, which orthotope has sides parallel to the axes of the multi-dimensional input space; and means for selecting candidate possible transmit signal points from an array of possible transmit signal points in multi-dimensional input space by selecting only those possible transmit signal points located inside the orthotope.

The first, second and third aspects of the present invention reduce the complexity of the problem of determining whether a given transmit signal point is to be considered as a candidate transmit signal point or not. This is achieved by selecting candidate transmit signal points located within an orthotope with at least some of its sides parallel to the corresponding axes of the input space. Then to determine whether a given transmit signal point is within the orthotope, a simple comparison can be carried out of the elements of the vectors defining the possible transmit signal point with the location of a corresponding parallel side of the orthotope. This is a less complex way of reducing the number of candidate transmit points in relation to which more complicated processing has to be carried out than is known in the prior art.

The MIMO channel may have N co-channel transmit antennas and M co-channel receive antennas where $N \leq M$. Although the present invention could also be applicable to MIMO channels in which N>M.

In order to locate the approximate transmit signal point, the following steps may be carried out:

receiving a set of signals at the M co-channel receive antennas and plotting a corresponding received signal point (y) in an M-dimensional output signal space; and mapping the received signal point to a corresponding noise corrupted transmit signal point ($\tau$) in an N-dimensional input signal space.

The orthotope may be constructed in the input signal space centred on the noise corrupted transmit signal point ($\tau$) so as to be large enough to encompass at least one candidate from an array of possible transmit signal points in the input space.

Further processing applied to the candidate transmit points may comprise the steps of:

transforming all the candidate transmit signal points inside the orthotope into output signal space to form a set of candidate received signal points;

calculating the Euclidean distance of the candidate received signal points from the received signal point (y); and selecting the candidate received signal point with the smallest Euclidean distance to be the detected received signal point.

According to a fourth aspect of the present invention, there is provided, a method of maximum likelihood decoding for detecting the signals transmitted over a MIMO channel of a communication system in which there are N co-channel transmit antennas and M co-channel receive antennas, comprising the steps of:

receiving a set of signals at the M co-channel receive antennas and plotting a corresponding received signal point (y) in an M-dimensional output signal space;

mapping the received signal point to a corresponding noise corrupted transmit signal point ($\tau$) in an N-dimensional input signal space;

constructing an orthotope (22) in the input signal space centred on the noise corrupted signal point and having sides parallel to the axes of the multi-dimensional input space large enough to encompass at least one candidate from an array of possible transmit signal points in the input space;

transforming all the candidate transmit signal points in the orthotope into output signal space to form a set of candidate received signal points;

calculating the Euclidean distance of the candidate received signal points from the received signal point (y); and selecting the candidate received signal point with the smallest Euclidean distance to be the detected received signal point.

According to a fifth aspect of the present invention there is provided computer readable media for installation in a digital processor of a receiver of a MIMO channel of a communication system in which there are N co-channel transmit antennas and M co-channel receive antennas for detecting the signals transmitted over the MIMO channel, which computer readable media carries out the steps of:

receiving as an input a set of signals received from the M co-channel receive antennas and identifying a corresponding received signal point (y) in an M-dimensional output space;

mapping the received signal point to a corresponding noise corrupted transmit signal point ($\tau$) in an N-dimensional input signal space;

constructing an orthotope in the input signal space centred on the noise corrupted signal point and having sides parallel to the axes of the multi-dimensional input space large enough to encompass at least one candidate transmit signal point of an array of possible transmit signal points in input space;

transforming all the candidate transmit signal points in the orthotope into output signal space to form a set of candidate received signal points;

calculating the Euclidean distance of the candidate received signal points from the received signal point (y); and selecting the candidate received signal point with the smallest Euclidean distance to be the detected received signal point.

According to a sixth aspect of the present invention there provided a receiving apparatus of a single entity of a communications system which apparatus comprises a digital processor for detecting signals transmitted over a Multiple-input-Multiple-Output (MIMO) channel of the communication system which channel is sent by N co-channel transmit antennas, the receiving apparatus having M co-channel receive antennas for receiving the signals transmitted over the MIMO channel, which digital processor comprises:

means for receiving as an input a signal received from the M co-channel receive antennas and identifying a corresponding received signal point (y) in an M-dimensional output space;

means for mapping the received signal point to a corresponding noise corrupted transmit signal point (τ) in an N-dimensional input signal space;

means for constructing an orthotope (22) in the input signal space centred on the noise corrupted signal point and having sides parallel to the axes of the multi-dimensional input space large enough to encompass at least one candidate transmit signal point of an array of possible transmit signal points in input space;

means for transforming all the candidate transmit signal points in the orthotope into output signal space to form a set of candidate received signal points;

means for calculating the Euclidean distance of the candidate received signal points from the received signal point (y); and means for selecting the candidate received signal point with the smallest Euclidean distance to be the detected received signal point.

The fourth, fifth and sixth aspects of the present invention comprise the method of Parallelotope decoding. The main advantage of Parallelotope decoding over Generalised Sphere Decoding is that locating the input space lattice points which fall inside the orthotope aligned with the coordinates axes is simple, requiring no calculation, only comparisons. Locating input space lattice points which fall inside a hyperellipsoid as for GSD is computationally expensive.

In the third to sixth aspects of the present invention constructing the orthotope is done by constructing a hypersphere in output signal space centred on the received signal point and having a radius ($c^{1/2}$) large enough to encompass at least one of an array of possible received signal points in the output signal space; transforming the hypersphere to construct a corresponding hyperellipsoid in input signal space centred on the noise corrupted signal point; and constructing an orthotope in the input signal space which is the smallest orthotope which contains the hyperellipsoid.

According to a seventh aspect of the present invention there is provided a method of maximum likelihood decoding for detecting the signals transmitted over a MIMO channel of a communication system in which there are N co-channel transmit antennas and M co-channel receive antennas, comprising the steps of:

generating an N-dimensional array of possible transmit signal points in an N-dimensional input space and generating a corresponding M-dimensional array of possible receive signal points in an M-dimensional output space;

receiving a set of signals at the M co-channel receive antennas and plotting a corresponding received signal point (y) in the M-dimensional output signal space;

constructing a hypersphere (18) in output signal space centred on the received signal point and having a radius ($c^{1/2}$) large enough to encompass at least one possible received signal point in the array;

transforming the hypersphere into input signal space to construct a corresponding hyperellipsoid (20) in input signal space;

constructing an orthotope (22) in the input signal space which is the smallest orthotope which contains the hyperellipsoid (20) and which has sides which are parallel to the axes of the multi-dimensional input space;

assessing all the possible transmit signal points in the orthotope and discarding those which are outside the hyperellipsoid to generate a set of candidate transmit points;

transforming the candidate transmit points into output signal space to generate a set of candidate receive signal points;

calculating the Euclidean distance of the candidate received signal points from the received signal point (y); and selecting the candidate received signal point with the smallest Euclidean distance to be the detected received signal point.

According to an eighth aspect of the present invention there is provided computer readable media for installation in a digital processor of a receiver of a MIMO channel of a communication system in which there are N co-channel transmit antennas and M co-channel receive antennas for detecting the signals transmitted over the MIMO channel, which computer readable media carries out the steps of:

generating an N-dimensional array of possible transmit signal points in an N-dimensional input space and generating a corresponding M-dimensional array of possible receive signal points in an M-dimensional output space;

receiving as an input a signal received from the M co-channel receive antennas and identifying a corresponding received signal point (y) in the M-dimensional output space;

constructing a hypersphere in output signal space centred on the received signal point and having a radius ($c^{1/2}$) large enough to encompass at least one possible received signal point in the array;

transforming the hypersphere into input signal space to construct a corresponding hyperellipsoid in input signal space;

constructing an orthotope in the input signal space which is the smallest orthotope which contains the hyperellipsoid and which has sides which are parallel to the axes of the multi-dimensional input space;

assessing all the possible transmit signal points in the orthotope and discarding those which are outside the hyperellipsoid to generate a set of candidate transmit points;

transforming the candidate transmit points into receive signal space to generate a set of candidate receive signal points;

calculating the Euclidean distance of the candidate received signal points from the received signal point (y); and selecting the candidate received signal point with the smallest Euclidean distance to be the detected received signal point.

According to a ninth aspect of the present invention there is provided a receiving apparatus of a single entity of a communications system which apparatus comprises a digital processor for detecting signals transmitted over a Multiple-Input-Multiple-Output (MIMO) channel of the communication system which channel is sent by N co-channel transmit antennas, the receiving apparatus having M co-channel receive antennas for receiving the signals transmitted over the MIMO channel, which digital processor comprises:

means for generating an N-dimensional array of possible transmit signal points in an N-dimensional input space and generating a corresponding M-dimensional array of possible receive signal points in an M-dimensional output space;

means for receiving as an input a signal received from the M co-channel receive antennas and identifying a corresponding received signal point (y) in the M-dimensional output space;

means for constructing a hypersphere (18) in output signal space centred on the received signal point and having a radius ($c^{1/2}$) large enough to encompass at least one possible received signal point in the array;

means for transforming the hypersphere into input signal space to construct a corresponding hyperellipsoid (20) in input signal space;

means for constructing an orthotope (22) in the input signal space which is the smallest orthotope which contains the hyperellipsoid (20) and which has sides which are parallel to the axes of the multi-dimensional input space;

means for assessing all the possible transmit signal points in the orthotope and discarding those which are outside the hyperellipsoid to generate a set of candidate transmit points;

means for transforming the candidate transmit points into receive signal space to generate a set of candidate receive signal points;

means for calculating the Euclidean distance of the candidate received signal points from the received signal point (y); and means for selecting the candidate received signal point with the smallest Euclidean distance to be the detected received signal point.

The seventh to ninth aspects of the present invention relate to orthotope sphere decoding, which is a hybrid of generalised sphere decoding and parallelotope decoding. It has the advantage of being computationally less complex than either generalised sphere decoding or parallelotope decoding for most MIMO channels.

The following additional steps may be used when the Euclidean distance calculated for a candidate received signal point is $(c')^{1/2}$ where c'<c:

re-constructing a smaller orthotope (22) derived from a smaller hyperellipsoid (20) derived from a smaller hypersphere (18) of radius $(c')^{1/2}$;

discarding all the remaining candidate transmit signal points which are not in the smaller orthotope and discarding those of the remaining candidate transmit signal points which are not in the smaller hyperellipsoid to generate a new set of candidate received signal points; and calculating the Euclidean distance of the new set of candidate received signal points from the received signal point (y).

The steps of calculating the Euclidean distance of the candidate received signal points from the received signal point (y) and selecting the candidate received signal point with the smallest Euclidean distance to be the detected received signal point may comprise the steps of:

where there are W candidate received signals sequentially selecting a wth one of the candidate received signal points, where w goes from 1 to W;

calculating the Euclidean distance $(c')^{1/2}$ for the wth candidate received signal point and if it is greater than the radius $c^{1/2}$ of the hypersphere (18) discarding the wth candidate received signal point and if it is less than the radius $c^{1/2}$ reducing the radius $c^{1/2}$ to the radius $(c')^{1/2}$.

The initial radius $c^{1/2}$ of the hypersphere suitable for the MIMO channel may be selected according to the Gentiles of a distribution simulated for a given modulation scheme and given values of N (number of co-channel transmit antennas), M (number of co-channel receive antennas) and signal-to-noise ratio $\sigma^2/P$, where P is the power of the transmitted signal and $\sigma^2$ is the noise variance of the MIMO channel;

wherein the distribution is generated by the following steps:

i. for a given time step, frame and channel, selecting an initial value of c to be $c=\sigma^2/P$;

ii. determining whether at least one possible receive signal point is located in the hypersphere centred on a received signal point (y) and having radius $c^{1/2}$;

iii. if no possible receive signal point is located, increasing c by $\sigma^2/P$;

iv. repeating steps ii and iii until at least one possible receive signal point is located in the hypersphere and storing the final value of c;

v. repeating steps i to iv over all time steps, over all frames and channels to build up the distribution of the final value of c;

vi. selecting a value of c corresponding to the fiftieth or seventy fifth centile of the distribution.

This helps to ensure (but does not guarantee) that the hypersphere is large enough to contain the possible receive signal points closest to the actual received signal and thus the corresponding orthotope is large enough to contain the corresponding possible transmit signal point. If the hypersphere is not large enough c is increased until it is.

The step of transforming an element from input space to output space may comprise applying a channel mapping to the element in input space, which mapping represents the characteristics of the channel and the step of transforming an element from output space to input space may comprise applying an inverse channel mapping to the element in output space, which mapping is an inverse of a mapping which represents the characteristics of the channel.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

In order that the present invention is more fully understood and to show how the same may be carried into effect, reference shall now be made, by way of example only, to the Figures as shown in the accompanying drawing sheets, wherein.

DETAILED DESCRIPTION OF PREFERRED EMBODIMENTS

There will now be described by way of example the best mode contemplated by the inventor for carrying out the invention. In the following description, numerous specific details are set out in order to provide a complete understanding of the present invention. It will be apparent, however, to those skilled in the art that the present invention may be put into practice with variations of the specific.

Figure 1:
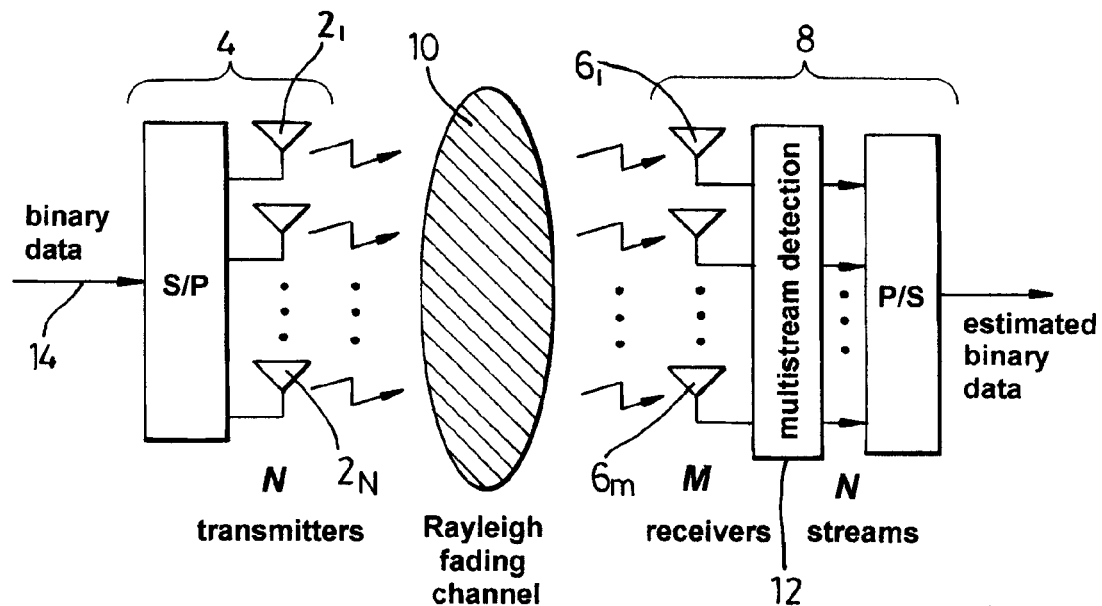
FIG. 1 shows a typical Multiple-Input-Multiple-Output (MIMO) channel of a wireless communications system.

With reference to FIG. 1, the present invention relates to the detection of information symbols, or data, sent using N multiple co-channel transmit antennas ($2_1 \ldots 2_N$) of a transmitter (4) of a single entity and received by using M multiple co-channel receive antennas ($6_1 \ldots 6_M$) of a receiver (8) of a single entity over a Multiple-Input-Multiple-Output (MIMO) channel (10) of a wireless communications system. The single entities (4, 8) may, for example, be a mobile user equipment or a base station of the wireless communications system. The MIMO channel may be between two mobile user equipments (peer-to-peer), between two base stations or between a mobile user equipment and a base station. By employing a MIMO channel, very high capacity can be achieved as compared to single antenna systems in a flat fading or Rayleigh fading environment. As indicated above, optimal performance of the channel can be obtained by implementing a Maximum Likelihood Detector (MLD) (12) at the output of the receive antennas ($6_1 \ldots 6_M$). The MLD (12) may be a digital processor on which computer readable media or software controlling the MLD process is loaded. However, for moderate numbers N of transmit antennas ($2_1 \ldots 2_N$) and for higher order modulation schemes, the MLD is generally too costly to implement, as discussed above.

The main application for a MIMO channel is in wireless communication systems, however, MIMO channels can also arise in wired channels where there is coupling or cross-talk between the wires. Then the number of transmitters would be equal to the number of receivers.

In the examples set out below it is assumed that there are a large number of scatterers in the environment over which the channel (10) extends and that all the antennas ($2_1 \ldots 2_N$) and ($6_1 \ldots 6_M$) are spaced for uncorrelated Rayleigh fading. The model used in the examples for the channel (10) assumes flat fading between each pair of transmitting and receiving antennas. The examples given below of the present invention apply for systems where the number of transmitting antennas ($2_1 \ldots 2_N$) is less than or equal to the number of receiving antennas ($6_1 \ldots 6_M$), ie. $N \leq M$. It is further assumed that the transmitter (4) has no knowledge of the channel (10), but that the receiver (8) can track the channel characteristics perfectly. In the examples set out below, the binary input data (14) are assumed to be independent and identically distributed and no encoding, such as Forward Error Correction coding is implemented before serial-to-parallel conversion at the transmitter (4). However, the MLD schemes described herein could be adapted for other configurations of binary input data, such as those employing forward error correction coding and should work for any digital modulation scheme. In the examples considered below, all the signals transmitted by the transmitting antennas ($2_1 \ldots 2_N$) use the same modulation scheme, although the MLD schemes described herein could be adapted for more general cases. It is assumed that the channel is quasi-static, ie. the channel does not change over the frame length J. The transmitter is assumed to organise the transmitted data into frames or bursts of data which are transmitted contiguously.

While certain assumptions are made in the examples provided herein, the principles of the present invention including parallelotope decoding and orthotope sphere decoding could be applied to other systems in which other assumptions apply.

If T seconds is the symbol period of the binary data, assuming the transmissions from the N transmit antennas ($2_1 \ldots 2_N$) are synchronous and that each symbol to be transmitted is sent to exactly one transmitting antenna then the system equation is:

$$y(t) = P^{1/2} H(t) x(t) + \sigma n(t) \quad (1)$$

where

P is the power transmitted by one transmit antenna;

$y(t) \in \mathbb{C}^M$ is the received signal vector at time t;

H(t) is the M by N channel matrix (channel map in FIG. 2) and each entry is assumed to be independent and identically distributed as $\mathbb{C}N(0, 1)$. H(t) at time t is determined by the receiver (8) based on test data known to the receiver which is: periodically transmitted by the transmitter (4) across the channel (10);

$x(t) \in \mathbb{C}^N$ is the vector of the signal transmission from the N transmit antennas at time t. The components of x(t) are the constellation points from the signal space diagram corresponding to the modulation scheme used; and $\sigma n(t)$ is Additive White Gaussian Noise (AWGN). The components of n(t) are assumed to be independently and identically distributed as $\mathbb{C}N(0, 1)$ and $\sigma^2$ is the noise variance.

In this example, Generalised Sphere Decoding is implemented in real and not complex space, as described below. The system equation (1) may be written using real co-ordinates as $$\tilde{y} = P^{1/2} \overline{H} \overline{x} + \sigma \overline{n} \quad (2)$$

Where, using $^T$ to denote transpose, $\overline{y} = (\text{real}(y^T), \text{imag}(y^T))^T$, $$\overline{H} = \begin{pmatrix} \text{real}(H) & -\text{imag}(H) \\ \text{imag}(H) & \text{real}(H) \end{pmatrix} \quad (3)$$

$\overline{x} = (\text{real}(x^T), \text{imag}(x^T))^T$ and $\overline{n} = (\text{real}(n^T), \text{imag}(n^T))^T$. For field $\mathcal{F} \in \{\mathbb{R}, \mathbb{C}\}$, an integer $K \geq 1$, a vector $w_0 \in \mathcal{F}^K$ and a radius $\alpha > 0$, let $$D(w_0, \alpha) = \{w \in \mathcal{F}^K : d(w_0, w) < \alpha\} \quad (4)$$

where $d(w_0, w)$ is the Euclidean distance from $w_0$ to w.

The K-dimensional object $D(w_0, \alpha)$ is a solid disc of radius $\alpha$ with a centre point $w_0$. For any set A in $\mathcal{F}^K$ let cl(A) denote its closure. This closure is a shape in K-dimensional space that contains within it the previously specified lattice points. Given a received vector of $y \in \mathbb{C}^M$, a channel H, a power P and squared radius $c > 0$, a conversion is made to real coordinates (as set out in (2) above) and a search is made for the closest lattice point to $\bar{y}$ (of the form $P^{1/2}\bar{H}\bar{x}$) in cl(D$(\bar{y}, c^{1/2})$). The search is not performed in cl(D$(\bar{y}, c^{1/2})$), a closed disc whose boundary is a hypersphere (18) of dimension 2M−1; but instead in its inverse image with respect to $(P^{1/2}\bar{H})$. Since $N \leq M$, this inverse image is a closed set of finite volume in $\mathbb{R}^{2N}$. Its centre is $((P^{1/2}\bar{H})^+\bar{y})$, where $\bar{H}^+$ denotes the pseudo-inverse of $\bar{H}$, and its boundary is a hyperellipsoid (20) of dimension 2N−1. Input space lattice points within the hyperellipsoid (20) are located and the one corresponding to the closest output lattice space point is the chosen estimate, If no lattice point is found within the hyperellipsoid (and hence no output lattice point is found within the hypersphere), the squared radius c of the hypersphere is increased and the search repeated until at least one is located. By bounding the search in this way the computation load of MLD is reduced.

Let $\bar{\Omega} = \{\mu \in \mathbb{R}^{2N} : (\mu_1, \ldots, \mu_N)^T + i(\mu_{N+1}, \ldots, \mu_{2N}) \in \Omega\}$ be the set of possible constellation points of a modulation scheme. For simplicity it is assumed that $\bar{\Omega} \subset \mathbb{Z}^{2N}$, that is, the elements of $\bar{\Omega}$ have integer components. This requirement is not essential, but can usually be met by scaling. For example, for 4-QAM modulation scheme, after scaling by $2^{1/2}$, $\bar{\Omega} = \{\mu \in \mathbb{R}^{2N} : \mu_K \in \{\pm 2, 0\}, 1 \leq k \leq 2N; \mu_K = 0$ if and only if $\mu_{k+N} \neq 0, 1 \leq k \leq N\}$. To begin, a noisy approximation to the transmitted signal vector, is obtained by zero forcing detection, namely:

$$\tau = (P^{1/2}H)^+ y \in \mathbb{C}^N \quad (5)$$

using complex coordinates. Thus, $\tau$ is the mapping of the received signal vector into transmit space and is also referred to herein as the noise corrupted transmit signal point. If using real coordinates the equation (5) becomes, $$\bar{\tau} = (P^{1/2}\bar{H})^+ \bar{y} \in \mathbb{R}^{2N} \quad (6)$$

where $\bar{\tau} = (\text{real}(\tau^T), \text{imag}(\tau^T))^T$.

The problem is to minimise the quadratic form:

$$q(\xi) = \|P^{1/2}\bar{H}\xi\|^2 \quad (7)$$

By varying the input space noise term $$\xi = \bar{\tau} - \mu \quad (8)$$

where $\mu \in \bar{\Omega} \subset \mathbb{Z}^{2N}$. $P\bar{H}^H\bar{H}$, where $\bar{H}^H$ denotes the Hermitian transpose of $\bar{H}$, is positive definite. Cholesky factorisation yields an upper triangular 2N by 2N matrix R over $\mathbb{R}$ such that $Q = P\bar{H}^H\bar{H} = R^T R$. Hence $\xi$ must satisfy equation (8) and $$q(\xi) = \|R\xi\|^2 \leq c. \quad (9)$$

Starting with the last component $\xi_{2N}$ and working backwards, suitable vectors $\xi$ are determined. For example $\xi_{2N}$ must satisfy:

$$\|\xi_{2N}\|^2 \leq c/(R_{2N,2N})^2 \quad (10)$$

and $\xi_{2N} = \tau_{2N} - \mu_{2N}$, where $\mu_{2N} \in \mathbb{Z}$. The notation $R_{2N,2N}$ denotes the 2Nth row and the 2Nth column of the matrix R. For a given value of $\xi_{2N}$, $\xi_{2N-1}$ must satisfy:

$$\|R_{2N-1,2N-1}\xi_{2N-1} + R_{2N-1,2N}\xi_{2N}\|^2 \leq c - \|R_{2N,2N}\xi_{2N}\|^2 \quad (11)$$

and $\xi_{2N-1} = \tau_{2N-1} - \mu_{2N-1}$, where $\mu_{2N-1} \in \mathbb{Z}$. The coordinates of vector $\xi$ can be worked through backwards in this way, deriving similar equations, until the first coordinate $\xi_1$ is reached. If equations (10) and (11) are satisfied, for all coordinates of vector $\xi$, then the point $\mu$, when transformed into output space is inside the hypersphere (18) placed around the received signal vector y. Its Euclidean distance from y can then be calculated. As soon as equations (10) and (11) are not satisfied for a coordinate of vector $\xi$, then the point $\mu$, when transformed into output space is outside the hypersphere (18) and so that point $\mu$ is discarded.

Parallelotope decoding is an enhancement, according to the present invention, of the Generalised Sphere Decoding scheme described above, which can provide reduce computational load, in certain circumstances, in systems similar to that described above in relation to FIG. 1 where $N \leq M$.

Parallelotope Decoding (PD), is based on GSD. Like GSD, the performance of PD is achieved with a reduced workload compared to MLD, because the search is bounded. The computational complexity of GSD per received symbol derives mainly from determining all the input lattice points which are within a given hyperellipsoid (20) in $\mathbb{R}^{2N}$. PD can in many circumstances be preferable to GSD, because it makes the bounding easier. Instead of bounding the signal points in the input (transmitted) signal space by a hyperellipsoid (20), PD bounds the signal points in the input (transmitted) signal space by an orthotope (22) (multi-dimensional box with sides parallel to axes of the input signal space). This orthotope transforms into a parallelotope (24) (multi-dimensional parallelepiped) in the received signal space. The orthotope (22) is defined as the smallest such multi-dimensional box that entirely contains the hyperellipsoid (20) derived by the GSD scheme. With the sides of the box parallel to the axes of the input signal space, this makes it computationally very simple to locate the signal points that are located within the orthotope (22).

Figure 2:
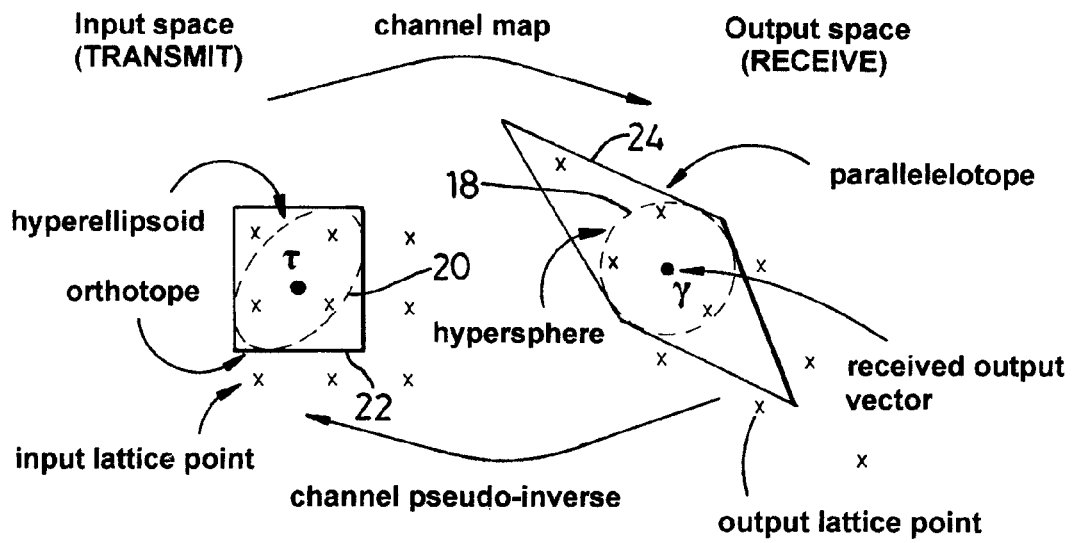
FIG. 2 shows the input space and output space of the MIMO channel of FIG. 1, showing the geometry used in Generalised Sphere Decoding and in the enhanced Maximum Likelihood Decoding (MLD) schemes according to the present invention.

Parallelotope decoding is an attempt to reduce complexity by searching for input lattice points falling inside the smallest orthotope (22) (ie. box generalised to higher dimensions) which contains the hyperellipsoid (20) and which is preferably aligned with the coordinate axes, as shown in FIG. 2. By aligning with the co-ordinate axes it is meant that if $Y \neq 0$ is a normal to any face of the orthotope, then $Y = g_k e_k$ where $g_k$ is a purely real or purely imaginary number and $e_k$ is the standard k-th unit vector $1 \leq k \leq N$. The PD scheme can be implemented using either complex or real coordinates, although when listing input lattice points inside the orthotope, the real and imaginary parts of the vector components are considered separately. The description below uses complex co-ordinates.

An example of the Parallelotope decoding (PD) scheme is described below with reference to the flow chart of FIG. 3. The flowchart depicts an example of the parallelotope decoding kernel using 16-QAM. By scaling by $(0.4)^{1/2}$ (Boxes 114 and 117), the input lattice points are made to take integer values.

The inputs required for PD are shown in Box 101, and are the channel matrix H, the power P, the squared radius c of the hypersphere (18), the matrix Q defined above, $\tau$, and a function $\Phi$ of H, P, c and $\tau$ which represents the orthotope. The dimensions of the required orthotope (the centre of which is $\tau = (P^{1/2}H)^+ y$) are calculated using the channel state information and the chosen squared radius c (Box 102). Enumerating input lattice points within the orthotope is simple and requires no calculation, only comparisons of a lattice point's co-ordinates with those of the orthotope.

Boxes 103 to 106 produce input signal lattice point coordinates for consideration and Box 112 carries out the comparison with the orthotope coordinates.

The orthotope is constructed (see box 102 of FIG. 3) as follows:

If $P^{1/2}H=UDV^H$ is a singular value decomposition (SVD), where unitary $U \in \mathbb{C}_{M,M}$, unitary $V \in \mathbb{C}_{N,N}$, and matrix $D \in \mathbb{C}_{M,N}$, has the form:

$$D = \begin{bmatrix} S \\ 0 \end{bmatrix} \quad (12)$$

where $$S = \begin{bmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_N \end{bmatrix}$$

and $\{\lambda_i\}_{i=1 \text{ to } N}$, are the non-singular values of $P^{1/2}H$ then the Moore-Penrose inverse $$(P^{1/2}H)^+ = VBU^H \quad (13)$$

where $B=(S^{-1}\ 0)$
and $B \in \mathbb{C}_{N,M}$. By (13), $$(P^{1/2}H)^+ U(:,k) = \begin{cases} V(:,k)/\lambda_k & 1 \le k \le N \\ 0 & N+1 \le k \le M \end{cases} \quad (14)$$

where $U(:,k)$ and $V(:,k)$ are the kth columns of U and V, respectively. Since U is unitary, the closed disc in $\mathbb{C}^M$ with centre of origin and radius one $$cl(D(0,1)) = \left\{ a \in \mathbb{C}^M : \sum_{k=1}^M \|a_k\|^2 \le 1 \right\} \quad (15)$$

$$= U(cl(D(0,1)))$$

$$= \left\{ \sum_{k=1}^M U(:,k)a_k : a \in \mathbb{C}^M : \sum_{k=1}^M \|a_k\|^2 \le 1 \right\}$$

Hence the image $(P^{1/2}H)^+ cl(D(0, c^{1/2}))$ is equal to $$\Xi(H,P,c,0) = \left\{ \sum_{k=1}^N (c^{1/2}/\lambda_k)V(:,k)a_k : \sum_{k=1}^N \|a_k\|^2 \le 1 \right\} \quad (16)$$

a closed set of finite volume whose centre is the origin and whose boundary is a hyperellipsoid. Since $(P^{1/2}H)^+$ is a linear maps one can define the translation of the hyperellipsoid to be centred on τ

$$\Xi(H,P,c,\tau)=(P^{1/2}H)^+ cl(D(y,c^{1/2}))=\{z+\tau : z \in \Xi(H,P,c,0)\} \quad (17)$$

The smallest orthotope aligned with the coordinate axes containing $(P^{1/2}H)^+ cl(D(y, c^{1/2}))$ can be located by determining the maximum absolute value of $f_k$ constrained to the disc $D(0, 1)$ where $f_k$ is the kth component of the map f defined by:

$$f : \mathbb{C}^M \to \mathbb{C}^N$$

$$a \to \sum_{k=1}^N (c^{1/2}/\lambda_k)V(:,k)a_k,$$

$1 \le k \le N$. Since $\|f_k(a)\|=\|f_k(\exp(i\theta)a)\|$ for all real θ, this turns out to be the maximum value of real $(f_k)$ constrained to the hypersphere $S^{2M-1}$ which bounds $D(0, 1)$. Using Lagrange multipliers it is found that for $1 \le k \le N$, $$\max\{\|f_k(a)\|\} \text{ for } a \in D(0,1) = \max\{\text{real}(f_k)\}$$
$$\text{for } a \in S^{2M-1} = c^{1/2}\delta_k$$

where $$\delta_k = \left( \sum_{j=1}^N \frac{\|V(k,j)\|^2}{\lambda_j^2} \right)^{1/2} \quad (18)$$

Since $\delta_k$ is the maximum absolute value of the projection of $\Xi(H,P,1,0)$ into the kth complex plane, $\epsilon_k$ depends on P and H but not on the particular SVD used to calculate it. So, $\Phi(H,P,c,0)$ in $\mathbb{C}^N$ can be defined to be the boundary of $$\{b \in \mathbb{C}^N : \|\text{real}(b_k)\| \le c^{1/2}\delta_k \text{ and } \|\text{imag}(b_k)\| \le c^{1/2}\delta_k,$$
$$1 \le k \le N\} \quad (19)$$

This boundary is an orthotope centred at the origin which contains $\Xi(H,P,c,\tau)$. If $\Phi(H,P,c,\tau)$ in $\mathbb{C}^N$ is defined to be the translation $$\{x \in \mathbb{C}^N : x=b+\tau, b \in \Phi(H,P,c,0)\} \quad (20)$$

Figure 3:
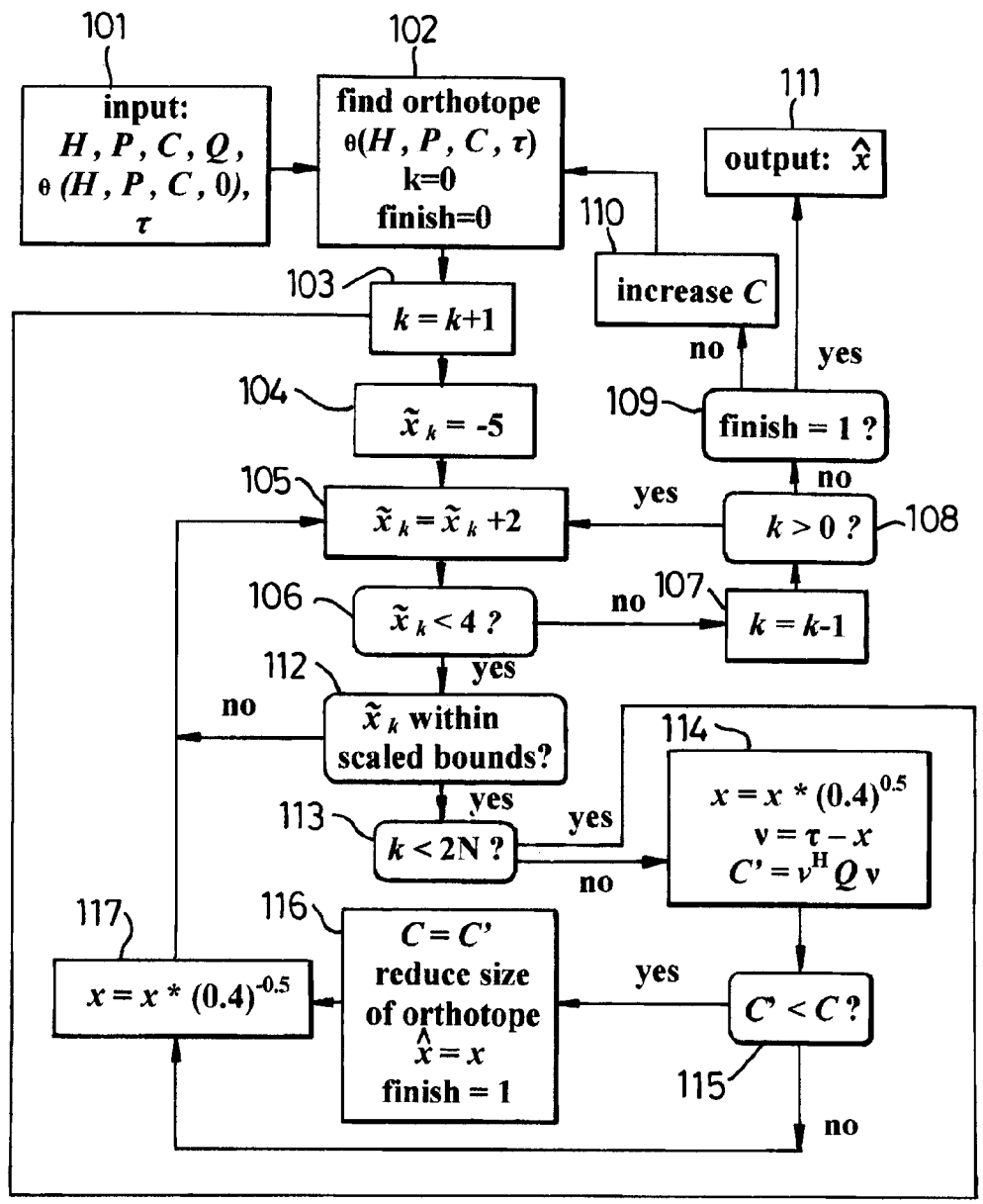
FIG. 3 shows a flow chart of the steps used in a Parallelotope Decoding (PD) scheme according to the present invention.

This translated boundary is the smallest orthotope in $\mathbb{C}^N$ centred on τ containing $(P^{1/2}H)^+ cl(D(y, c^{1/2}))$ which is aligned with the real and imaginary coordinate axes, ie. the orthotope (22) of FIG. 2 has been found (see Box 102 of FIG. 3).

Then $d(P^{1/2}Hx,y)$ is calculated for successive lattice points x within the orthotope. The output lattice points located fall within a parallelotope (24) (parallelogram or parallelepiped generalised to higher dimensions) whose centre is y. The parallelotope (24) contains the image of the hyperellipsoid (20) with respect to the channel mapping $P^{1/2}H$, a hypersphere (18) of dimension 2N-1. If N=M, it contains the original closed disc $cl(D(y,c^{1/2}))$. Output space lattice points not in $cl(D(y,c^{1/2}))$ are discarded (box 115) and the input lattice point corresponding to the closest remaining output lattice point is chosen as the estimate of the transmitted symbol vector (box 111). Each time an output lattice point is located inside the disc at distance $(c')^{1/2} < c^{1/2}$ from y (box 115), c is reduced to c' and the dimensions of the orthotope are scaled down to correspond (box 116). If no output lattice point is found, c is increased, the dimensions of the orthotope scaled up to correspond (boxes 107, 108, 109, 110) and the search repeated until at least one output lattice point is located in the original closed disc $cl(D(y,c^{1/2}))$.

The orthotope (22) must contain the pre-image $$\{x \in \mathbb{C}^N : P^{1/2}Hx \in cl(D(y,c^{1/2}))\} \quad (21)$$

which pre-image is the set of all input space points which map to the closed disc with centre y, with respect to the channel map.

Since $N \leq M$, this pre-image is equal to $(P^{1/2}H)^+cl(D(y, c^{1/2}))$. Hence, the orthotope in $\mathbb{C}^N$ required, denoted (H, P, c, τ), is the smallest orthotope with centre τ, which contains $(P^{1/2}H)^+cl(D(y,c^{1/2}))$ and which is aligned with the real and imaginary co-ordinate axes. A method of constructing it is given above. If $N \leq M$, then the image $(P^{1/2}H)^+cl(D(y,c^{1/2}))$ is a closed set of finite volume whose centre is $(P^{1/2}H)^+y$ and whose boundary is a hyperellipsoid (20).

To reduce complexity, the distance calculation in $\mathbb{C}^M$ is reduced to a positive definite quadratic form in $\mathbb{C}^N$ as follows. For any $x \in \mathbb{C}^N$, $(d(y, (P^{1/2}Hx))^2 = \upsilon^H Q \upsilon$ where $\upsilon = \tau - x$ and $Q = PH^H H$ (see box 114).

Parallelotope decoding is designed for (N, M) systems where $N \leq M$. For $N > M$, the pre-image of equation (12) is equal to:

$$(P^{1/2}H)^+cl(D(y,c^{1/2})) \times Ker(H^+H) \quad (22)$$

where $Ker(H^+H) = \{x \in \mathbb{C}^N : H^+Hx = 0\}$. The latter sub-space is isomorphic to $\mathbb{C}^{N,M}$ and, in general, not aligned with any of the real or imaginary co-ordinate axes. Hence searching for the input lattice points whose real and imaginary coordinates are bounded independently is not appropriate and GSD should be used instead.

A disadvantage with the parallelotope decoding scheme described above is that there may be many signal points that lie within the orthotope (22), but which do not lie within the hyperellipsoid (20). Those transmit signal points which lie within the orthotope (22) but outside the hyperellipsoid (20) are not the most likely transmitted signal, because by definition, the corresponding received signal points in output space cannot have lower Euclidean distances from the actual received signal point, than the received signal points corresponding to the transmit signal points within the hyperellipsoid. So compared to GSD, PD may save computational effort in identifying which signal points to be searched over, but because in some cases the PD may have identified many signal points that lie within the orthotope (22) but not in the hyperellipsoid (20), a significant amount of computational load can be wasted in calculating the Euclidean distances for the points outside the hyperellipsoid. This is a particular problem when the eigenvalues (singular values) of the channel matrix H vary significantly, in which case the orthotope (22) will have a substantially greater volume than the hyperellipsoid. This corresponds to the physical situation where it is difficult for the receiver (8) to distinguish between the signals transmitted from the different transmit antennas ($2_1 \ldots 2_N$). Also, PD requires more computational load to set up per frame than GSD.

The main advantage of Parallelotope decoding over Generalised Sphere Decoding is that locating the input space lattice points which fall inside the orthotope aligned with the coordinates axes is simple, requiring no calculation, only comparisons. Locating input space lattice points which fall inside a hyperellipsoid as for GSD is computationally expensive.

In order to reduce the computational load of both PD and GSD, a hybrid approach is proposed according to the present invention, called orthotope sphere decoding (OSD). This scheme requires more computational load to set up per frame than GSD or PD, but once set up is generally less complex to run. For higher order modulation schemes and MIMO channels it is usually the least computationally costly of the MLD schemes considered herein. This is true for all but very short frame length and very low SNRs. The scheme has two key stages:

(1) It uses parallelotope decoding, as described above, to obtain candidate input space lattice points that lie in the orthotope; and
(2) It then applies GSD only to these candidate-points to find the closest lattice point to the received vector y.

The scheme begins in the same manner as PD, by retaining only those input space lattice points which fall inside an orthotope (see boxes 202, 203 to 208 and 212).

Figure 4:
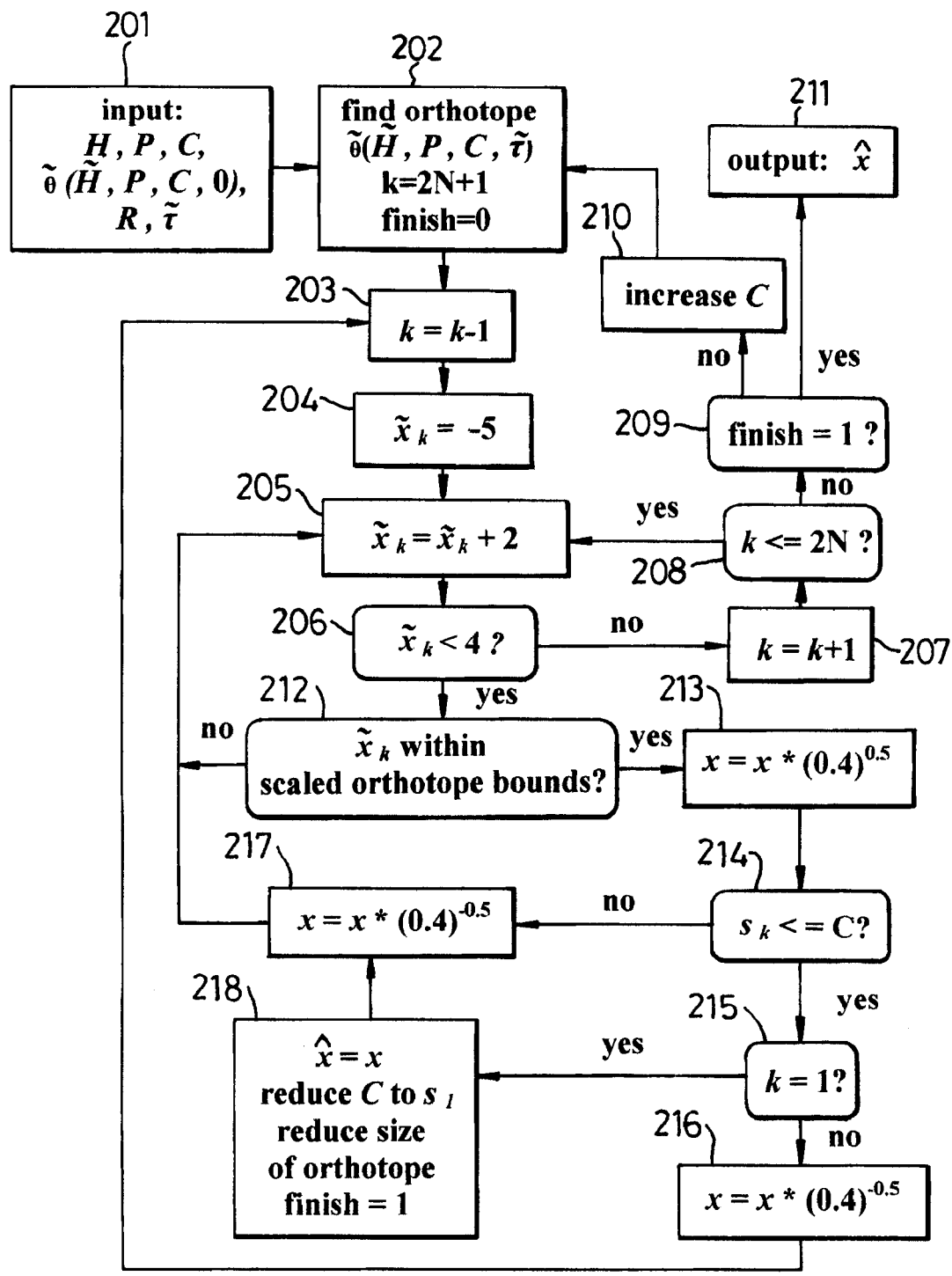
FIG. 4 shows a flow chart of the steps used in an Orthotope Sphere Decoding scheme according to the present invention.

Working with real coordinates, given a power P, a complex channel H and a squared radius c, a singular value decomposition of the real matrix $P^{1/2}\tilde{H}$ is calculated. Then, using Lagrange Multipliers as described above for PD the orthotope $\overline{\Phi}(\tilde{H},P,c,0)$ in $\mathbb{R}^{2N}$, whose centre is the origin, which is aligned with the coordinate axes and which is just big enough to contain the image $(P^{1/2}\tilde{H})^+cl(D(0,c^{1/2}))$ is constructed (see box 202 in FIG. 4).

Given a point inside the orthotope, the algorithm uses the GSD Cholesky factorisation to discard those points lying outside the corresponding hyperellipsoid. As for GSD the Cholesky factorisation yields an upper triangular 2N by 2N matrix R over $\mathbb{R}$ such that $P \tilde{H}^T \tilde{H} = R^T R$. For each received input y, $\tilde{\tau} = (P^{1/2}\tilde{H})^+ \tilde{y} \in \mathbb{R}^{2N}$ is found and the translation of the orthotope by $\tilde{\tau}$ is considered. This translated orthotope is denoted $\overline{\Phi}(\tilde{H},P,c,\tilde{\tau})$. For each input space lattice point μ, the input space noise term $\xi \xi = \tilde{\tau} - \mu$ is calculated.

In the same way as for GSD, the components of $r = R\xi$ are calculated, one by one, starting with $r_{2N}$ and working backwards. At the kth step, $1 \leq k \leq N$, $$s_{2N-k+1} = \sum_{j=2N-k+1}^{2N} \|r_j\|^2 \quad (23)$$

is calculated and if greater than c, the point is discarded (box 214). Hence many input lattice space points which lie in the orthotope but outside of the hyperellipsoid are quickly discarded, with only a subset of the components of such points needing to be considered. For a vector μ within the orthotope, let $$c' = (d(\tilde{y}, P^{1/2}\tilde{H}\mu))^2 = (d(0, P^{1/2}\tilde{H}\xi))^2 = \sum_{k=1}^{2N} \|r_k\|^2 \quad (24)$$

If $c' < c$, then the output lattice point $P^{1/2}\tilde{H}\mu$ is within the hypersphere and is the closest to $\tilde{y}$ found so far. The squared radius c is reduced to c', the orthotope is scaled down in size accordingly and the search through the (now smaller) orthotope continues (box 218).

If no points are found in the orthotope, c is increased, the size of the orthotope is scaled up accordingly and the search is repeated (boxes 209, 210).

The most efficient starting values of c for the parallelotope decoding and orthotope sphere decoding described above can be estimated by experimental simulations. In initial simulations, for each frame, for each received vector, an initial value of $c = \sigma^2/P$ is used. If no output space lattice points in the hypersphere are located, then c is increased by $\sigma^2/P$. This procedure is iterated until an output space lattice point, is found in the hypersphere of squared radius of $\alpha \sigma^2/P$, $\alpha\sigma Z$. As output lattice space points are found in the hypersphere of squared radius $\alpha\sigma^2/P$, c is decreased. The maximum squared radius $\alpha\sigma^2/P$ corresponding to the largest output space hypersphere considered in the above process is recorded. In order to obtain a distribution for the smallest value of c (constrained to be an integer multiple of $\sigma^2/P$) required to produce an output lattice point in the hypersphere, the simulation averages over randomly generated channels and frames for a given modulation scheme and given values of N and M and signal-to-noise ratio $\sigma^2/P$.

Figure 5:
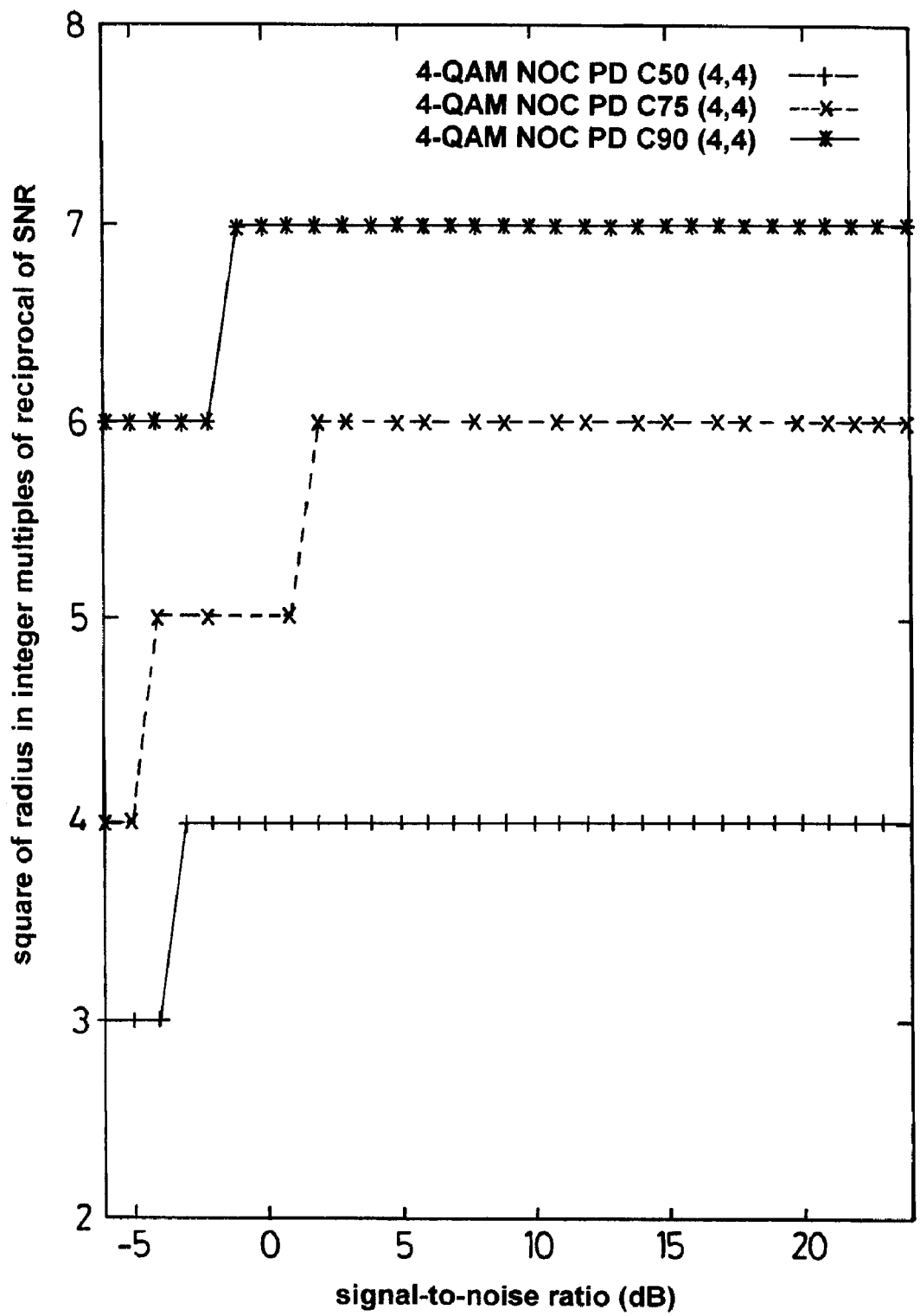
FIG. 5 shows a graph of the fiftieth, seventy fifth and ninetieth centiles for the distribution of the value of c (the squared radius of the hypersphere of FIG. 2) required to find at least one point in the output space hypersphere versus signal-to-noise ratio.

Each simulation yields a distribution of $\alpha\sigma^2/P$. Fiftieth, seventy fifth and ninetieth centiles for the distribution corresponding to a simulation of parallelotope decoding of a N=4, M=4 MIMO channel using 4QAM, averaging over 3000 randomly generated channels, with frame length J=100 are plotted in FIG. 5, versus SNR. It has been found that the most efficient value of c to begin with, namely $c=\beta\sigma^2/P$, corresponds to the fiftieth or seventy fifth centile (at medium SNRs).

The maximum likelihood decoder (12) of FIG. 12 may be configured as a Parallelotope Decoder arranged to carry out Paralleltope Decoding as described above. The decoder may include a digital processor on which computer readable media or software is run for carrying out the steps shown in the flow chart of FIG. 3. There now follows a further explanation of the steps carried out by the Parallelotope Decoder (12), in particular the steps carried out by computer readable media installed on a digital processor of the Parallelotope decoder with specific reference to FIG. 3.

Box 101: working in input signal space $\mathbb{C}^N$ and in output signal space $\mathbb{C}^M$, the Parallelotope Decoder (PD) inputs required are the channel H, power P, the initial chosen square of radius c (C in FIG. 3) of the hypersphere in output signal space, Q which is a quadratic form equal to $PH^HH$ representing the square of distance, $\Phi(H,P,c,0)$ which is the smallest orthotope with centre the origin, which contains $(P^{1/2}H)^+cl(D(y,c^{1/2}))$ and which is aligned with the real and imaginary co-ordinate axes and $\tau=(P^{1/2}H)^+y$ which is the noisy approximation to the input space signal point that was transmitted (and we are trying to estimate).

Box 102: working in input signal space $\mathbb{C}^N$ and in output signal space $\mathbb{C}^M$, (by translating $\Phi(H,P,c,0)$ by $\tau$) the orthotope $\Phi(H,P,c,\tau)$ is found which is the smallest orthotope with centre $\tau$, which contains $(P^{1/2}H)^+cl(D(y,c^{1/2}))$ and which is aligned with the real and imaginary co-ordinate axes; set k=0 where k represents dimension in input signal space $\mathbb{R}^{2N}$ and set finish to zero (that is, false,) as the location of the best estimate of the input signal sent is not yet finished.

Box 103: increase k by one, then consider the k-th dimension in input signal space now identified with $\mathbb{R}^{2N}$ (start with the first dimension).

N.B. vectors in input signal space are scaled so that lattice points have co-ordinates in $\{\pm 3, \pm 1\}$ (see boxes 104, 105, 106 and 112) and this requires a corresponding scaling in output space.

Boxes 104 and 105: here the scaled input signal space co-ordinates are considered, in box 104 initialise k-th coordinate to −5, it will be incremented by 2 in box 105, this means that co-ordinate values −3, −1, 1 and 3 appropriate for 16-QAM are considered (as the algorithm progresses).

Box 106: for 16-QAM check (scaled) k-th coordinate not too big.

Box 107: if (scaled) k-th coordinate equals 5 (out of range), go back to previous (lower) dimension.

Box 108: if k=0 exhausted the search.

Box 109: finish equals one if at least one output space lattice point has been located in an output space hypersphere with centre y.

Box 110: finish equals zero if no output space lattice point is located in an output space hypersphere, this means c (C) is too small it is increased.

Box 111: An input space lattice point has been located which maps to the output space lattice point closest to y with respect to Euclidean distance (and hence achieved our goal).

Box 112: check if (scaled) k-th coordinate is within the interval defined as the projection of the (scaled) orthotope into the k-th dimension Box 113: if k=2N we have found a (scaled) vector of signal transmissions (of dimension 2N) whose components are in the set $\{\pm 3, \pm 1\}$ and which lies within the (scaled) orthotope Box 114: the squared distance from y of the output signal space vector corresponding to the vector of signal transmissions under consideration (not scaled now) is calculated.

Boxes 115 and 116: if the output signal space vector is within the hypersphere register that a possible input signal space solution has been found by setting finish to true (one), set the best estimate to the input signal space vector under consideration (not scaled) and reduce the squared radius of the hypersphere so that output signal space lattice points further from y than the one under consideration are from now on excluded from the hypersphere (and the closed disc it bounds).

Boxes 115 and 117: if the output signal space vector is out with the hypersphere (box 115), rescale the input signal space coordinates (so that lattice points have co-ordinates in $\{\pm 3, \pm 1\}$ (box 117), then increase the last coordinate by 2 (box 105).

Box 113 and 103: if the dimension under consideration is not the last (k<2N) then consider the next one (increase k), begin by setting this co-ordinate equal to −3 (104 and 105).

Alternatively, the maximum likelihood decoder (12) of FIG. 12 may be configured as an Orthotope Sphere Decoder arranged to carry out Orthotope Sphere Decoding as described above. The decoder may include a digital processor on which computer readable media or software is run for carrying out the steps shown in the flow chart of FIG. 4. There now follows a further explanation of the steps carried out by the Orthotope Sphere Decoder (12), in particular the steps carried out by computer readable media installed on a digital processor of the Orthotope Sphere Decoder with specific reference to FIG. 4.

Box 201: identifying input signal spaces $\mathbb{C}^N$ and $\mathbb{R}^{2N}$; OSD inputs required are the channel H, power P, the initial chosen square of radius c (C in FIG. 4) of the hypersphere in output signal space, $\tilde{\Phi}(\tilde{H},P,c,0)$ in $\mathbb{R}^{2N}$ which is the smallest orthotope with centre the origin, which contains $(P^{1/2}\tilde{H})^+cl(D(0,c^{1/2}))$ and which is aligned with the co-ordinate axes and $\tilde{\tau}=(P^{1/2}\tilde{H})^+\tilde{y}$ in $\mathbb{R}^{2N}$ which is the noisy approximation to the input space constellation point that was transmitted (and that is being estimated).

Box 202: find (by translating $\tilde{\Phi}(\tilde{H},P,c,0)$ by $\tilde{\tau}$) the orthotope $\tilde{\Phi}(\tilde{H},P,c,\tilde{\tau})$ which is the smallest orthotope with centre $\tilde{\tau}$, which contains $(P^{1/2}\tilde{H})^+cl(D(\tilde{y},c^{1/2}))$ and which is aligned with the co-ordinate axes; set k=2N+1 where k represents, dimension in input signal space $\mathbb{R}^{2N}$; and set finish to zero (that is, false,) as the location of the best estimate of the input signal sent is not yet finished.

Box 203: decrease k by one, then consider the k-th dimension in input signal space now identified with $\mathbb{R}^{2N}$ (start with the 2N-th dimension).

N.B. the vectors in input signal space are scaled so that lattice points have co-ordinates in $\{\pm 3, \pm 1\}$ (see boxes 204, 205, 206 and 212) and this requires a corresponding scaling in output space.

Boxes 204 and 205: here the scaled input signal space co-ordinates are considered, initialise k-th coordinate to $-5$ (box 204), it will be incremented by 2 in box 205, this means that lattice point coordinate values $-3, -1, 1$ and 3 appropriate for 16-QAM are considered (as we progress through the algorithm).

Box 206: for 16-QAM check (scaled) k-th co-ordinate not too big.

Box 207: if (scaled) k-th co-ordinate equals 5 (out of range), go back to previously considered (higher) dimension.

Box 208: if k=2N+1 exhausted the search.

Box 209: finish equals one if at least one output space lattice point has been located in an output space hypersphere with centre y, Box 210: finish equals zero if no output space lattice point has been located in an output space hypersphere with centre y, this means c (C) is too small so it is increased.

Box 211: an, input space lattice point has been located which maps to the output space lattice point closest to y with respect to Euclidean distance (and hence the goal is achieved).

Box 212: check if (scaled) k-th co-ordinate is within the interval defined as the projection of the (scaled) orthotope into the k-th dimension.

Boxes 213 and 214: check, using coordinates labelled k, ..., 2N, if the input signal space vector (not scaled) under consideration is possibly within the hyperellipsoid with centre $\tilde{\tau}$.

Boxes 215 and 218: if k=1 and $s_1 \leq c$ (C) then an input signal space lattice point within the hyperellipsoid has been located, this is registered by setting finish to true (one), setting the best estimate of the transmitted signal to be the input signal space vector under consideration (not scaled) and reducing the squared radius of the hypersphere so that output signal space lattice points further from y than the one under consideration are from now on excluded from the hypersphere (and the closed disc it bounds).

Boxes 214, 215, 216, 203, 204 and 205: if k>1 (Box 215) and $s_1 \leq c$ (C) (Box 214) then all but the first k-1 co-ordinates of an input signal space lattice point which may be within the hyperellipsoid have been determined, rescale input signal space vectors so that lattice points have co-ordinates in $\{\pm 3, \pm 1\}$ (Box 216) decrease k by one (Box 203) and hence consider the next co-ordinate, first try setting this coordinate to $-3$ (Boxes 204 and 205).

The invention claimed is:

1. A method of maximum likelihood decoding for detecting signals transmitted over a Multiple-Input-Multiple-Output (MIMO) channel of a communication system in which there are N co-channel transmit antennas and M co-channel receive antennas where N and M are integers, comprising the steps of:

receiving a signal at the M co-channel receive antennas and plotting a corresponding received signal point (y) in an M-dimensional output signal space;

mapping the received signal point to a corresponding noise corrupted transmit signal point ($\tau$) in an N-dimensional input signal space;

considering an array of possible transmit signal points in the input signal space, limiting a candidate set of the array of possible transmit signal points to those located inside an orthotope centered on the noise corrupted transmit signal point derived from the received signal, which orthotope has sides parallel to the axes of the input signal space; and processing the limited candidate set of possible transmit signal points to determine a detected received signal point.

2. A method according to claim 1, wherein the orthotope (22) in the input signal space centered on the noise corrupted transmit signal point is large enough to encompass at least one candidate from the array of possible transmit signal points in the input signal space.

3. A method according to claim 1 wherein further steps of the method applied to the limited candidate set of possible transmit signal points comprise:

transforming all the candidate transmit signal points located inside the orthotope into the output signal space to form a set of candidate received signal points;

calculating the Euclidean distance between each of the candidate received signal points and the received signal point (y); and selecting the candidate received signal point having the smallest Euclidean distance from the received signal point (y) to be the detected received signal point.

4. A method of maximum likelihood decoding for detecting signals transmitted over a Multiple-Input-Multiple-Output (MIMO) channel of a communication system in which there are N co-channel transmit antennas and M co-channel receive antennas where N and M are integers, comprising the steps of:

receiving a signal at the M co-channel receive antennas and plotting a corresponding received signal point (y) in an M-dimensional output signal space;

mapping the received signal point to a corresponding noise corrupted transmit signal point ($\tau$) in an N-dimensional input signal space;

constructing an orthotope (22) in the input signal space centered on the noise corrupted transmit signal point and having sides parallel to the axes of the input signal space large enough to encompass at least one candidate from an array of possible transmit signal points in the input signal space;

transforming all the candidate transmit signal points located inside the orthotope into the output signal space to form a set of candidate received signal points;

calculating the Euclidean distance between each of the candidate received signal points and the received signal point (y); and selecting the candidate received signal point having the smallest Euclidean distance from the received signal point (y) to be the detected received signal point.

5. A method according to claim 4 wherein the step of constructing the orthotope in the input signal space, comprises the steps of:

constructing a hypersphere (18) in the output signal space centered on the received signal point and having an initial radius ($c^{1/2}$) large enough to encompass at least one of an array of possible received signal points in the output signal space;

transforming the hypersphere into the input signal space to construct a corresponding hyperellipsoid (20) in the input signal space centered on the noise corrupted transmit signal point; and constructing an orthotope (22) in the input signal space which is the smallest orthotope which contains the hyperellipsoid (20).

6. A method according to claim 4 wherein the step of transforming an element from the input signal space to the output signal space comprises applying a channel mapping to the element in the input signal space, which mapping represents the characteristics of the channel.

7. A method according to claim 4 wherein the step of transforming an element from the output signal space to the input signal space comprises applying an inverse channel mapping to the element in the output signal space, which mapping is an inverse of a mapping which represents the characteristics of the channel.

8. A method according to claim 5 wherein the steps of calculating the Euclidean distance between each of the candidate received signal points and the received signal point (y) and selecting the candidate received signal point having the smallest Euclidean distance from the received signal point (y) to be the detected received signal point, comprise the steps of:
   where there are W candidate received signals points sequentially selecting a wth one of the candidate received signal points, where w goes from 1 to W and W is an integer;
   calculating the Euclidean distance $(c')^{1/2}$ for the wth candidate received signal point and if it is greater than the radius $c^{1/2}$ of the hypersphere (18) discarding the wth candidate received signal point and if it is less than the radius $c^{1/2}$ reducing the radius $c^{1/2}$ to the value of $(c')^{1/2}$.

9. A method according to claim 5 wherein the initial radius $c^{1/2}$ of the hypersphere (18) is selected according to a distribution simulated for a given modulation scheme and given values of N, M and signal-to-noise ratio $\sigma^2/P$, wherein the distribution is generated by following the steps of:
   i. for a given time step, frame and channel, selecting an initial value of c to be $c=\sigma^2/P$;
   ii. determining whether at least one of the set of candidate received signal points is located inside the hypersphere centered on a received signal point (y) and having radius $c^{1/2}$;
   iii. if none of the set of candidate received signal points is located, increasing c by $\sigma^2/P$;
   iv. repeating steps ii and iii until at least one of the set of candidate received signal points is located in the hypersphere and storing the final value of c;
   v. repeating steps i to iv over all time steps, over all frames and over all channels of the simulation to build up a distribution of the final value of c;
   vi. selecting a value of c corresponding to the distribution.

10. Computer readable media storing a computer program for installation and execution in a digital processor of a receiver detecting signals transmitted over a Multiple-Input-Multiple-Output (MIMO) channel of a communication system in which there are N co-channel transmit antennas and M co-channel receive antennas where N and M are integers, the computer program containing instructions when executed in the digital processor for carrying out the steps of:
   receiving a signal at the M co-channel receive antennas and plotting a corresponding received signal point (y) in an M-dimensional output signal space;
   mapping the received signal point to a corresponding noise corrupted transmit signal point ($\tau$) in an N-dimensional input signal space;
   constructing an orthotope in the input signal space centered on the noise corrupted transmit signal point, which orthotope has sides parallel to the axes of the input signal space;
   selecting possible transmit signal points from an array of possible transmit signal points in the input signal space by selecting only those possible transmit signal points located inside the orthotope; processing the limited candidate set of possible transmit signal points to determine a detected received signal point.

11. Computer readable media storing a computer program according to claim 10 wherein the step of constructing an orthotope (22) comprises constructing an orthotope in the input signal space centered on the noise corrupted transmit signal point large enough to encompass at least one candidate from the array of possible transmit signal points in the input signal space.

12. Computer readable media storing a computer program according to claim 10 the computer program further containing additional instructions when executed for additionally carrying out the following steps:
   transforming all the selected possible transmit signal points inside the orthotope into the output signal space to form a set of candidate received signal points;
   calculating the Euclidean distance between each of the candidate received signal points and the received signal point (y); and
   selecting the candidate received signal point having the smallest Euclidean distance from the received signal point (y) to be the detected received signal point.

13. Computer readable media storing a computer program for installation and execution in a digital processor of a receiver of a Multiple-Input-Multiple-Output (MIMO) channel of a communication system in which there are N co-channel transmit antennas and M co-channel receive antennas where N and M are integers for detecting the signals transmitted over the MIMO channel, the computer program containing instructions when executed in the digital processor for carrying out the steps of:
   receiving as an input a signal received from the M co-channel receive antennas and identifying a corresponding received signal point (y) in an M-dimensional output signal space;
   mapping the received signal point to a corresponding noise corrupted transmit signal point ($\tau$) in an N-dimensional input signal space;
   constructing an orthotope (22) in the input signal space centered on the noise corrupted transmit signal point and having sides parallel to the axes of the input signal space large enough to encompass at least one candidate transmit signal point of an array of possible transmit signal points in the input signal space;
   transforming all the candidate transmit signal points located inside the orthotope into the output signal space to form a set of candidate received signal points;
   calculating the Euclidean distance between each of the candidate received signal points and the received signal point (y); and
   selecting the candidate received signal point having the smallest Euclidean distance from the received signal point (y) to be the detected received signal point.

14. Computer readable media storing a computer program according to claim 13 wherein the step of constructing the orthotope in the input signal space, comprises the steps of:
   constructing a hypersphere (18) in the output signal space centered on the received signal point and having an initial radius ($c^{1/2}$) large enough to encompass at least one of an array of possible received signal points in the output signal space;

transforming the hypersphere into the input signal space to construct a corresponding hyperellipsoid (20) in the input signal space centered on the noise corrupted signal point; and constructing an orthotope (22) in the input signal space which is the smallest orthotope which contains the hyperellipsoid (20) and which has sides which are parallel to the axes of the input signal space.

15. Computer readable media storing a computer program according to claim 13 wherein the step of transforming an element from the input signal space to the output signal space comprises applying a channel mapping to the element in input signal space, which mapping represents the characteristics of the channel.

16. Computer readable media storing a computer program according to claim 13 wherein the step of transforming an element from the output signal space to the input signal space comprises applying an inverse channel mapping to the element in the output signal space, which mapping is an inverse of a mapping which represents the characteristics of the channel.

17. Computer readable media storing a computer program according to claim 14 wherein the steps of calculating the Euclidean distance between each of the candidate received signal points and the received signal point (y) and selecting the candidate received signal point having the smallest Euclidean distance to be the detected received signal point, comprises the steps of:

where there are W candidate received signal points sequentially selecting a wth one of the candidate received signal points, where w goes from 1 to W and W is an integer;

calculating the Euclidean distance $(c')^{1/2}$ for the wth candidate received signal point and if it is greater than the radius $c^{1/2}$ of the hypersphere (18) discarding the wth candidate received signal point and if it is less than the radius $c^{1/2}$ reducing the radius $c^{1/2}$ to the as value of $(c')^{1/2}$.

18. Computer readable media storing a computer program according to claim 14 wherein the initial radius $c^{1/2}$ of the hypersphere (18) is selected according to a distribution simulated for a given modulation scheme and given values of N, M and signal-to-noise ratio $\sigma^2/P$, wherein the distribution is generated by following the steps of:

i. for a given time step, frame and channel, selecting an initial value of c to be $c=\sigma^2/p$;

ii. determining whether at least one of the set of candidate received signal points is located inside the hypersphere centered on a received signal point (y) and having radius $c^{1/2}$;

iii. if none of the set of candidate received signal points is located, increasing c by $\sigma^2/P$;

iv. repeating steps ii and iii until at least one of the set of candidate received signal points is located in the hypersphere and storing the final value of c;

v. repeating steps i to iv over all time steps, over all frames and over all channels of the simulation to build up a distribution of the final value of c;

vi. selecting a value of c corresponding to the distribution.

19. A method of maximum likelihood decoding for detecting signals transmitted over a Multiple-Input-Multiple-Output (MIMO) channel of a communication system in which there are N co-channel transmit antennas and M co-channel receive antennas where N and M are integers, comprising the steps of:

generating an N-dimensional array of possible transmit signal points in an N-dimensional input signal space and generating a corresponding M-dimensional array of possible receive signal points in an M-dimensional output signal space;

receiving a signal at the M co-channel receive antennas and plotting a corresponding received signal point (y) in the output signal space;

constructing a hypersphere (18) in the output signal space centred on the received signal point and having an initial radius ($c^{1/2}$);

transforming the hypersphere into the input signal space to construct a corresponding hyperellipsoid (20) in the input signal space;

constructing an orthotope (22) in the input signal space which is the smallest orthotope which contains the hyperellipsoid (20) and which has sides which are parallel to the axes of the input signal space;

assessing the array of possible transmit signal points in the orthotope and discarding those which are outside the orthotope to generate a set of candidate transmit signal points;

transforming the set of candidate transmit signal points into the output signal space to generate a set of candidate receive signal points;

calculating the Euclidean distance between each of the candidate received signal points and the received signal point (y); and selecting the candidate received signal point having the smallest Euclidean distance from the received signal point (y) to be the detected received signal point.

20. A method according to claim 19 comprising the step of mapping the received signal point to a corresponding noise corrupted transmit signal point ($\tau$) in the input signal space and centering the hyperellipsoid (20) in the input signal space on the noise corrupted transmit signal point ($\tau$).

21. A method according to claim 19 wherein the step of transforming an element from the input signal space to the output space comprises applying a channel mapping to the element in the input signal space, which mapping represents the characteristics of the channel.

22. A method according to claim 19 wherein the step of transforming an element from the output signal space to the input signal space comprises applying an inverse channel mapping to the element in the output signal space, which mapping is an inverse of a mapping which represents the characteristics of the channel.

23. A method according to claim 19 wherein the steps of calculating the Euclidean distance between each of the candidate received signal points and the received signal point (y) and selecting the candidate received signal point having the smallest Euclidean distance from the received signal point (y) be the detected received signal point, comprise the steps of:

where there are W candidate received signal points sequentially selecting a wth one of the candidate received signal points, where w goes from 1 to W and W is an integer;

calculating the Euclidean distance $(c')^{1/2}$ for the wth candidate received signal point and if it is greater than the radius $c^{1/2}$ of the hypersphere (18) discarding the wth candidate received signal point and if it is less than the radius $c^{1/2}$ reducing the radius $c^{1/2}$ to the value of $(c')^{1/2}$.

24. A method according to claim 19 carrying out the following additional steps when the Euclidean distance calculated for a candidate received signal point is $(c')^{1/2}$ where $c'<c$:
- re-constructing a smaller orthotope (22) derived from a smaller hyperellipsoid (20) derived from a smaller hypersphere (18) of radius $(c')^{1/2}$;
- discarding all remaining candidate transmit signal points which are not contained inside the smaller orthotope and discarding all remaining candidate transmit signal points which are not in the smaller hyperellipsoid to generate a new set of candidate received signal points; and
- calculating the Euclidean distance between each of the new set of candidate received signal points and the received signal point (y).

25. A method according to claim 19 wherein the initial radius $c^{1/2}$ of the hypersphere (18) suitable for the MIMO channel is selected according to a distribution simulated for a given modulation scheme and given values of N-co-channel transmit antennas, M co-channel receive antennas and signal-to-noise ratio $\sigma^2/P$, where P is the power of the transmitted signal and $\sigma^2$ is the noise variance of the MIMO channel, wherein the distribution is generated by the following steps:
- i. for a given time step, frame and channel, selecting an initial value of c to be $c=\sigma^2/P$;
- ii. determining whether at least one of the set of candidate received signal points is located inside the hypersphere centered on a received signal point (y) and having radius $c^{1/2}$;
- iii. if none of the set of candidate received signal points is located, increasing c by $\sigma^2/P$;
- iv. repeating steps ii and iii until at least one of the set of candidate received signal points is located in the hypersphere and storing the final value of c;
- v. repeating steps i to iv over all time steps, over all frames and over all channels of the simulation to build up a distribution of the final value of c;
- vi. selecting a value of c corresponding to the distribution.

26. Computer readable media storing a computer program for installation and execution in a digital processor of a receiver of a Multiple-Input-Multiple-Output (MIMO) channel of a communication system in which there are N co-channel transmit antennas and M co-channel receive antennas where N and M are integers for detecting the signals transmitted over the MIMO channel, the computer program containing instructions when executed in the digital processor for carrying out the steps of:
- generating an N-dimensional array of possible transmit signal points in an N-dimensional input signal space and generating a corresponding M-dimensional array of possible receive signal points in an M-dimensional output signal space;
- receiving as an input a signal received from the M co-channel receive antennas and identifying a corresponding received signal point (y) in the output signal space;
- constructing a hypersphere (18) in the output signal space centred on the received signal point and having an initial radius $(c^{1/2})$;
- transforming the hypersphere into the input signal space to construct a corresponding hyperellipsoid (20) in the input signal space;
- constructing an orthotope (22) in the input signal space which is the smallest orthotope which contains the hyperellipsoid (20) and which has sides which are parallel to the axes of the input signal space;
- assessing the array of possible transmit signal points in the orthotope and discarding those which are outside the orthotope to generate a set of candidate transmit signal points;
- transforming the candidate transmit points into the output signal space to generate a set of candidate receive signal points;
- calculating the Euclidean distance between each of the candidate received signal points and the received signal point (y); and
- selecting the candidate received signal point having the smallest Euclidean distance from the received signal point (y) to be the detected received signal point.

27. Computer readable media storing a computer program according to claim 26 comprising the step of mapping the received signal point to a corresponding noise corrupted transmit signal point ($\tau$) in the input signal space and centering the hyperellipsoid (20) in the input signal space on the noise corrupted transmit signal point ($\tau$).

28. Computer readable media storing a computer program according to claim 26 wherein the step of transforming an element from the input signal space to the output signal space comprises applying a channel mapping to the element in the input signal space, which mapping represents the characteristics of the channel.

29. Computer readable media storing a computer program according to claim 26 wherein the step of transforming an element from the output signal space to the input signal space comprises applying an inverse channel mapping to the element in the output signal space, which mapping is an inverse of a mapping which represents the characteristics of the channel.

30. Computer readable media storing a computer program according to claim 26 wherein the steps of calculating the Euclidean distance between each of the candidate received signal points and the received signal point (y) and selecting the candidate received signal point having the smallest Euclidean distance from the received signal point (y) to be the detected received signal point, comprise the steps of:
- where there are W candidate received signal points sequentially selecting a wth one of the candidate received signal points, where w goes from 1 to W and W is an integer;
- calculating the Euclidean distance $(c')^{1/2}$ for the wth candidate received signal point and if it is greater than the radius $c^{1/2}$ of the hypersphere (18) discarding the wth candidate received signal point and if it is less than the radius $c^{1/2}$ reducing the radius $c^{1/2}$ to the value of $(c')^{1/2}$.

31. Computer readable media storing a computer program according to claim 26 carrying out the following additional steps:
- where the Euclidean distance calculated for a candidate received signal point is $(c')^{1/2}$, determining when $c'<c$ and in response to such a determination carrying out the following steps:
- re-constructing a smaller orthotope (22) derived from a smaller hyperellipsoid (20) derived from a smaller hypersphere (18) of radius $(c')^{1/2}$;
- discarding all remaining candidate transmit signal points which are not contained inside the smaller orthotope and discarding all remaining candidate transmit signal points which are not in the smaller hyperellipsoid to generate a new set of candidate received signal points; and calculating the Euclidean distance between each of the new set of candidate received signal points and the received signal point (y).

32. Computer readable media storing a computer program according to claim 26 wherein the initial radius $c^{1/2}$ of the hypersphere (18) is selected according to a distribution simulated for a given modulation scheme and given values of N-co-channel transmit antennas, M co-channel receive antennas and signal-to-noise ratio $\sigma^2/P$, where P is the power of the transmitted signal and $\sigma^2$ is the noise variance of the MIMO channel, wherein the distribution is generated by the following steps:
 i. for a given time step, frame and channel, selecting an initial value of c to be $c=\sigma^2/P$;
 ii. determining whether at least one of the set of candidate received signal points is located inside the hypersphere centered on a received signal point (y) and having radius $c^{1/2}$;
 iii. if none of the set of candidate received signal points is located, increasing c by $\sigma^2/p$;
 iv. repeating steps ii and iii until at least one of the set of candidate received signal points is located in the hypersphere and storing the final value of c;
 v. repeating steps i to iv over all time steps, over all frames and over all channels of the simulation to build up a distribution of the final value of c;
 vi. selecting a value of c corresponding to the distribution.

33. A receiving apparatus of a single entity of a communications system which apparatus comprises a digital processor for detecting signals transmitted over a Multiple-Input-Multiple-Output (MIMO) channel of the communication system, which digital processor comprises:
 means for plotting a received signal point (y) in an M-dimensional output signal space corresponding to a set of signals received at the M co-channel receive antennas of the receiving apparatus; and
 means for mapping the received signal point to a corresponding noise corrupted transmit signal point ($\tau$) in an N-dimensional input signal space where N and M are integers;
 means for constructing an orthotope in the input signal space centered on the noise corrupted transmit signal point, which orthotope has sides parallel to the axes of the input signal space; and
 means for selecting possible transmit signal points from an array of possible transmit signal points in the input signal space by selecting only those possible transmit signal points located inside the orthotope; and
 processing the limited candidate set of possible transmit signal points to determine a detected received signal point.

34. Apparatus according to claim 33 wherein in order to construct the orthotope (22), the digital processor comprises means for constructing an orthotope in the input signal space centered on the noise corrupted transmit signal point large enough to encompass at least one candidate from the array of possible transmit signal points in the input signal space.

35. Apparatus according to claim 33 additionally comprising:
 means for transforming all the selected possible transmit signal points inside the orthotope into the output signal space to form a set of candidate received signal points;
 means for calculating the Euclidean distance between each of the candidate received signal points and the received signal point (y); and
 means for selecting the candidate received signal point having the smallest Euclidean distance from the received signal point (y) to be the detected received signal point.

36. A receiving apparatus of a single entity of a communications system which apparatus comprises a digital processor for detecting signals transmitted over a Multiple-Input-Multiple-Output (MIMO) channel of the communication system which channel is sent by N co-channel transmit antennas, the receiving apparatus having M co-channel receive antennas for receiving the signals transmitted over the MIMO channel where N and M are integers, which digital processor comprises:
 means for receiving as an input a signal received from the M co-channel receive antennas and identifying a corresponding received signal point (y) in an M-dimensional output signal space;
 means for mapping the received signal point to a corresponding noise corrupted transmit signal point ($\tau$) in an N-dimensional input signal space;
 means for constructing an orthotope (22) in the input signal space centered on the noise corrupted signal point and having sides parallel to the axes of the input signal space large enough to encompass at least one candidate transmit signal point of an array of possible transmit signal points in the input signal space;
 means for transforming all candidate transmit signal points located inside the orthotope into the output signal space to form a set of candidate received signal points;
 means for calculating the Euclidean distance between each of the candidate received signal points and the received signal point (y); and
 means for selecting the candidate received signal point having the smallest Euclidean distance from the received signal point (y) to be the detected received signal point.

37. Apparatus according to claim 36 wherein in order to construct the orthotope in the input signal space, the digital processor comprises:
 means for constructing a hypersphere (18) in the output signal space centered on the received signal point and having an initial radius ($c^{1/2}$) large enough to encompass at least one of an array of possible received signal points in the output signal space;
 means for transforming the hypersphere into the input signal space to construct a corresponding hyperellipsoid (20) in the input signal space centered on the noise corrupted signal point; and
 means for constructing an orthotope (22) in the input signal space which is the smallest orthotope which contains the hyperellipsoid (20) and which has sides which are parallel to the axes of the input signal space.

38. Apparatus according to claim 36 wherein in order to calculate the Euclidean distance between each of the candidate received signal points and the received signal point (y) and select the candidate received signal point having the smallest Euclidean distance from the received signal point (y) to be the detected received signal point, the digital processor comprises:
 where there are W candidate received signal points means for sequentially selecting a wth one of the candidate received signal points, where w goes from 1 to W and W is an integer; and
 means for calculating the Euclidean distance $(c')^{1/2}$ for the wth candidate received signal point and if it is greater than the radius $c^{1/2}$ of the hypersphere (18) discarding the wth candidate received signal point and if it is less than the radius $c^{1/2}$ reducing the radius $c^{1/2}$ to the value of $(c')^{1/2}$.

39. A receiving apparatus of a single entity of a communications system which apparatus comprises a digital processor for detecting signals transmitted over a Multiple-Input-Multiple-Output (MIMO) channel of the communication system which channel is sent by N co-channel transmit antennas where N and M are integers, the receiving apparatus having M co-channel receive antennas for receiving the signals transmitted over the MIMO channel, which digital processor comprises:

means for generating an N-dimensional array of possible transmit signal points in an N-dimensional input signal space and generating a corresponding M-dimensional array of possible receive signal points in an M-dimensional output signal space;

means for receiving as an input a signal received from the M co-channel receive antennas and identifying a corresponding received signal point (y) in the output signal space;

means for constructing a hypersphere (18) in the output signal space centered on the received signal point and having an initial radius $(c^{1/2})$;

means for transforming the hypersphere into the input signal space to construct a corresponding hyperellipsoid (20) in the input signal space;

means for constructing an orthotope (22) in the input signal space which is the smallest orthotope which contains the hyperellipsoid (20) and which has sides which are parallel to the axes of the input signal space;

means for assessing the array of possible transmit signal points in the orthotope and discarding those which are outside the orthotope to generate a set of candidate transmit points;

means for transforming the set of candidate transmit signal points into the output signal space to generate a set of candidate receive signal points;

means for calculating the Euclidean distance between each of the set of candidate received signal points and the received signal point (y); and means for selecting the candidate received signal point having the smallest Euclidean distance from the received signal point (v) to be the detected received signal point.

40. Apparatus according to claim 39 where in order to calculate the Euclidean distance between each of the candidate received signal points and the received signal point (y) and select the candidate received signal point having the smallest Euclidean distance from the received signal point (y) to be the detected received signal point, the digital processor comprises:

where there are W candidate received signal points means for sequentially selecting a wth one of the candidate received signal points, where w goes from 1 to W and W is an integer; and means for calculating the Euclidean distance $(c')^{1/2}$ for the wth candidate received signal point and if it is greater than the radius $c^{1/2}$ of the hypersphere (18) discarding the wth candidate received signal point and if it is less than the radius $c^{1/2}$ reducing the radius $c^{1/2}$ to the value of $(c')^{1/2}$.

41. Apparatus according to claim 39 wherein the digital processor additionally comprises:

where the Euclidean distance calculated for a candidate received signal point is $(c')^{1/2}$, means for determining when c'<c and in response to such a determination:

means for re-constructing a smaller orthotope (22) derived from a smaller hyperellipsoid (20) derived from a smaller hypersphere (18) of radius $(c')^{1/2}$;

means for discarding all remaining candidate transmit signal points which are not contained inside the smaller orthotope and discarding all remaining candidate transmit signal points which are not in the smaller hyperellipsoid to generate a new set of candidate received signal points; and means for calculating the Euclidean distance between each of the new set of candidate received signal points and the received signal point (y).

\* \* \* \* \*

UNITED STATES PATENT AND TRADEMARK OFFICE
CERTIFICATE OF CORRECTION

PATENT NO.         : 7,233,634 B1                                           Page 1 of 1
APPLICATION NO. : 10/401003
DATED              : June 19, 2007
INVENTOR(S)        : Catherine Hassell Sweatman and John Scott Thompson It is certified that error appears in the above-identified patent and that said Letters Patent is hereby corrected as shown below:

TITLE PAGE, ITEM (75) INVENTORS:
The name of the second inventor should properly be set forth as John Scott Thompson.

Signed and Sealed this

Twenty-first Day of August, 2007

JON W. DUDAS
*Director of the United States Patent and Trademark Office*